United States Patent [19]

McBride, Jr.

[11] 4,184,070
[45] Jan. 15, 1980

[54] CONNECTOR APPARATUS

[75] Inventor: Lyle E. McBride, Jr., Norton, Mass.

[73] Assignee: Texas Instruments Incorporated, Dallas, Tex.

[21] Appl. No.: 863,777

[22] Filed: Dec. 23, 1977

[51] Int. Cl.² .............................................. H01J 31/12
[52] U.S. Cl. ..................................... 250/227; 250/551
[58] Field of Search ............................. 250/227, 551; 350/96.15

[56] References Cited

U.S. PATENT DOCUMENTS 3,963,920  6/1976  Palmer ............................. 250/227 X

OTHER PUBLICATIONS

Stigliani, "Digital Design", May 1976, pp. 48, 50, 52.
Crow, "Optics Letters", Jul. 1977.
Bulletin entitled "An Introduction to Communication Fiberglass Design", prepared by Valter Corp. dated 1977.

Primary Examiner—David C. Nelms
Assistant Examiner—Darwin R. Hostetter
Attorney, Agent, or Firm—John A. Haug; James P. McAndrews

[57] ABSTRACT

A connector assembly comprises a lead frame mounting one or more semiconductor chips, having optically active areas, a fiber guide and optical fibers held in optical communication with the chips. The fiber guide is formed of a plate-like member having two or more reference points, in order to precisely locate the fibers relative to the chip. Several embodiments of the guide are shown including a plate having fiber-receiving bores extending therethrough as well as a plate having fiber-receiving grooves extending along sides thereof preferably used in conjunction with a bar biased against fibers disposed in the grooves. The bar is shown having a straight edge facing the grooves while a variation of the bar is provided with an additional set of grooves. Either the bar, its respective plate or both may be made of elastomeric material to allow for variations in fiber diameter. The lead frame mounts a relatively large thermal and electrically conductive pad which in turn mounts the semiconductor chip having optically active areas. Fibers are trained through respective bores or grooves and epoxied in alignment with respective optically active areas. The connector is adapted to be mounted on one side of a backplane while the electronic components such as drivers and amplifiers, associated with matching electrical characteristics of transmitting and receiving circuitry to those of the photo emitting and detecting elements of the chip are mounted on a second side of the back plane. A single connector may contain either or both photo emitting and photo detecting elements.

9 Claims, 6 Drawing Figures

CONNECTOR APPARATUS

This application relates generally to connectors and more specifically to apparatus for interfacing between electronic circuit modules and optical fibers.

Use of optical fibers is becoming more and more widespread in view of the many advantages they offer. For instance, due to their wide band width transmission capability a single fiber can carry the equivalent of thousands of telephone conversations at a given time. With regard to data transmission they offer immunity to electromagnetic interference (EMI) and radio frequency interference (RFI), have inherent non radiation characteristics and are electrical insulators. Problems such as grounding, crosstalk and short arcing can be eliminated using such fibers. Size also is an advantage. By way of example for the same information carrying capacity a fiber optic cable having a diameter of 30 mils can replace copper wire pairs having a bundle diameter of three inches. However this decrease in size over conventional copper wire also produces a problem, that of effectively and efficiently handling the fibers. Use of fiber optics entails mechanical precision problems. That is, in order to effectively utilize fiber optics light must be transmitted from a source within an acceptable range of intensity loss. In general a light source, for example a light emitting diode or a laser, is precisely located at the input end of the fiber. Light will enter the end of the fiber within a certain acceptance angle and will continue through the fiber reflecting back and forth from the core interface. The light may be modulated by electronic controls in a desired pattern and is received at the output end by a photo detector. This light path is fraught with losses including losses at the LED or laser, at the input into the cable and the output out of the cable and through the detector that converts the light impulses into electronic signals. Thus the means for positioning the fiber ends relative to the light source and the detector are very critical.

It is an object of this invention to provide an improved connector for interfacing between electronic circuit modules and optical fibers which minimizes light loss. Another object is the provision of electronic and fiber optic interfacing means which is easy to assemble yet accurate and one that is simple yet reliable. Other objects and features will be in part apparent and in part pointed out hereinafter.

Briefly, in accordance with the invention the interface is particularly useful with a backplane adapted to mount electronic modules on one side and having electrical connecting means on the opposite side, the interface comprising a housing mounting therein connector contact means and semi-conductor chip means having optically active areas, the chip means electrically connected to the connector contacts, a fiber optic cable extending into the housing with the ends of the fibers in optical communication with the optically active areas which include photo emitting and photo receiving elements on the same or separate chips. If on separate chips both may be provided in a single connector or they may be separated into different connectors so that a transmitter is disposed at one end of the cable with a receiver at the other end, the connector contact means adapted to be interconnected with the electrical connecting means on the opposite side of the backplane while the driver and amplifier electronics associated with matching the electrical characteristics of the transmitting and receiving circuitry to those of the photo emitting and detecting elements of the chip are mounted on the first mentioned side of the backplane.

BRIEF DESCRIPTION OF THE DRAWINGS

Corresponding reference characters indicate corresponding parts throughout the several views of the drawings.

DESCRIPTION OF PREFERRED EMBODIMENTS

Figure 2:
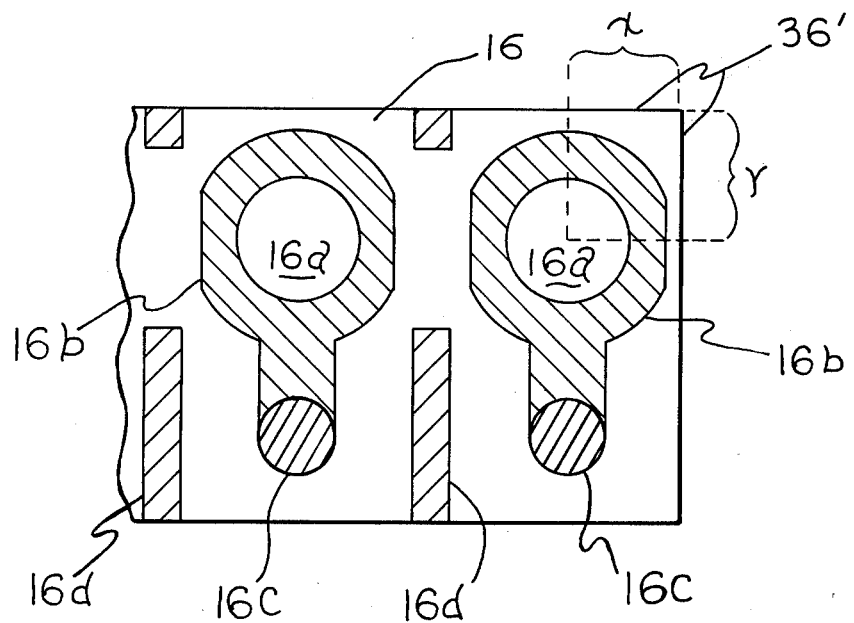
FIG. 2 is a top plan view of a portion of a semiconductor chip used in the FIG. 1 embodiment.

Referring now to the drawings, reference numeral 10 indicates a connector made in accordance with the invention comprising a lead frame 12 including a plurality of electrically conductive terminal members 14a–14n disposed along two columns, first distal ends bent into conventional female sockets such as cylindrical configurations 15 although it will be understood that the terminal members could be provided in a pin configuration if desired, and second distal ends bent to lie generally in a plane perpendicular to the axis of the cylinders or pins and directed to a central location within the area defined by the columns. Disposed within the central location are semiconductor chips 16 and 18. As best seen in FIG. 2 chip 16 is provided with a multi-element emitter array in which each element includes emitter area 16a, N-contact metallization 16b and bonding pad 16c. P-contact metallization 16d may be provided on the top of the chip to facilitate probing and testing of the diodes from the top as well as being provided on the bottom thereof. A suitable chip has an emitting area 16a diameter of 8 mils and a center to center emitter spacing of 18 mils. The width of the chip is 27.2 mils, the thickness 11 mils and the length, since chip 16 has six elements, is 105.2 mils. It will be understood that the particular number of elements provided on the chip and hence its length is a matter of choice.

The bonding pads 16c of chip 16 are electrically connected to respective lead frame legs using conventional techniques such as thermo compression bonding of gold wires 20.

Figure 3:
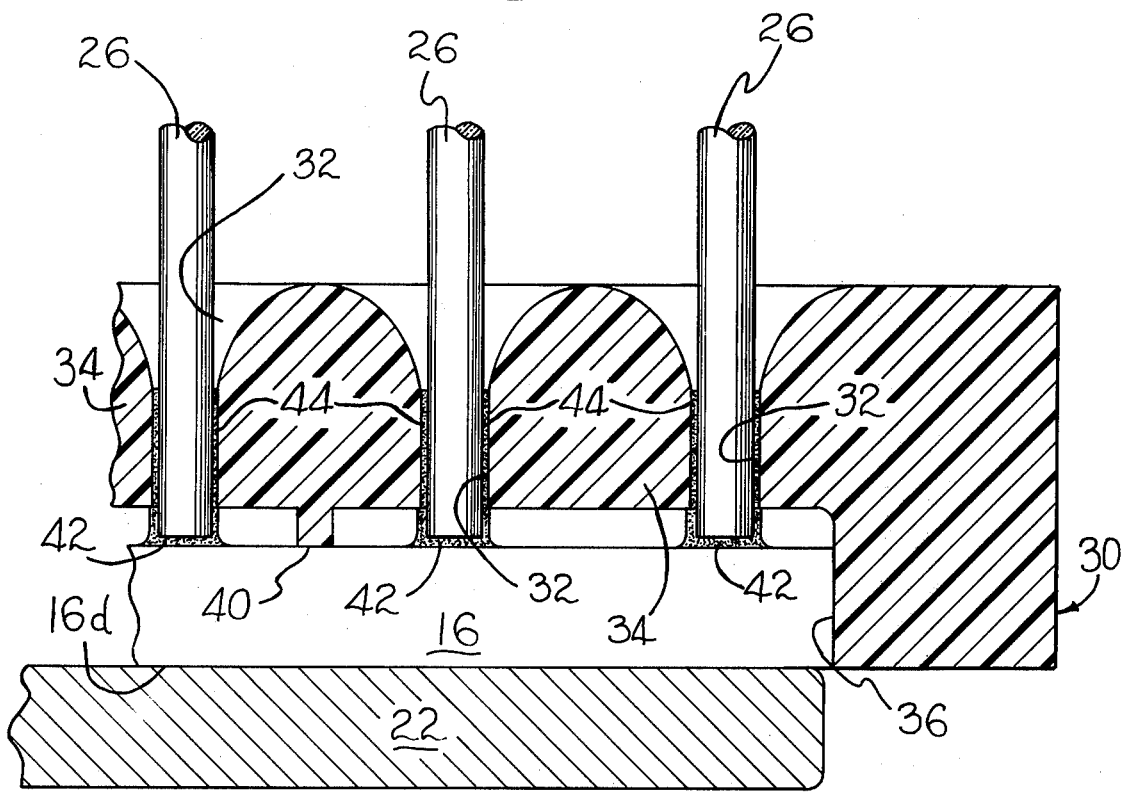
FIG. 3 is a cross sectional view of a portion of the semiconductor chip, fiber optic guide plate with fiber optics epoxied in place and heat sink pad.

Terminal member 14d preferably has its second distal end bent so that it lies in a plane parallel to that formed by the second distal ends of terminal members 14a–14c and 14e–14g but spaced downwardly therefrom in order to accommodate chip 16. The second distal end of terminal member 14d is formed into a relatively massive electrically and thermally conductive pad 22 which is connected by suitable means such as with conductive epoxy, to the P-contact metallization layer 16d on the bottom of chip 16 as best seen in FIG. 3.

A cable 24 comprising a bundle of optical fibers 26 is mounted so that the ends of the fibers are disposed in optical communication with respective emitting areas 16a. Although not shown in FIG. 1 in order to illustrate more clearly the arrangement of the fibers relative to the emitting area and the connection of the chip to the lead frame, a guide plate 30 is employed to precisely locate the fibers. With reference to FIG. 3 a plurality of bores 32 are formed in a single row through top wall 34 of guide plate 30. As seen in the figure the upper portion of the bores are tapered in a smooth curve to facilitate reception of respective fibers. It will be noted that the thickness of wall 34 is significantly greater than the diameter of bores 32 so that the longitudinal axes of the free end portion of the fibers trained through the bores will be held parallel to the axes of the bores. Guideplate 30 is formed with a recess therein to receive chip 16 and is provided with reference points, for example two points located at diametrically opposed corners, one such corner shown in FIG. 3 at 36. Plate 30 is positioned over chip 16 with corner 36′ of the chip (FIG. 2) contiguous to corner 36 of the guide plate so that the nearest adjacent emitting area 16a is precisely located relative thereto in both the length (x) and the width (y) direction. Thus the fibers which are trained through apertures 32 are precisely aligned with the emitting areas 16a. Bores 32 are formed so that their axes are perpendicular to the plane in which stop surfaces 40 lie so that the free ends of the fibers will be essentially perpendicular to the top surface of chip 16 to optimize optical coupling between the emitters and the fibers. Stop surface 40, which may be in the form of ribs extending across the plate, are adapted to rest against the chip and serve to locate the bottom surface of the guide plate a selected distance above the chip as well as to provide room for leads 20 which extend through a suitable cut away portion of the side wall of plate 30 and connect the terminal members to the chip. The fibers trained through their respective bores are biased against the chip using their inherent spring characteristics and are fixed in position with clear epoxy or other suitable material which serve as an index of refraction matching means to minimize light relection away from the fiber core. Preferably additional epoxy 44 is placed in the bores 32 to help affix the fibers. Epoxy 42,44 may conveniently be applied by dipping the ends of the fibers into an epoxy bath prior to insertion through the bores in plate 30 or if desired it could be injected in situ.

Semiconductor chip 18 is also mounted on frame 12 adjacent to chip 16. An electrically and thermally conductive pad 23, similar to pad 22 is provided on a distal end of terminal 14k and is bonded to a metallized layer of the back surface (not shown) of chip 18. Chip 18 may be of the same configuration as chip 16 but serves as a detector or receiver while chip 16 serves as an emitter or transmitter. Optical fibers 26 are attached to the photo sensitive areas 18a utilizing another guide plate 30 and additional wires 20 connect bonding pads 18c to terminal members 14h–14j and 14l–14n in the same manner as for chip 16.

The entire assembly is held in a jig and potting material is placed therearound to form a housing 46. Stress relief may be provided for cable 24 by any suitable means such as grommet 50 containing split collar 52 is conjunction with set screw 54. When set screw 54 is tightened cable 24 is firmly held by split collar 52 and grommet 50. Alternatively, cable 24 may be provided with a slight loop within the area to be potted so that after potting stress applied to the cable will be transferred to the housing.

Figure 1:
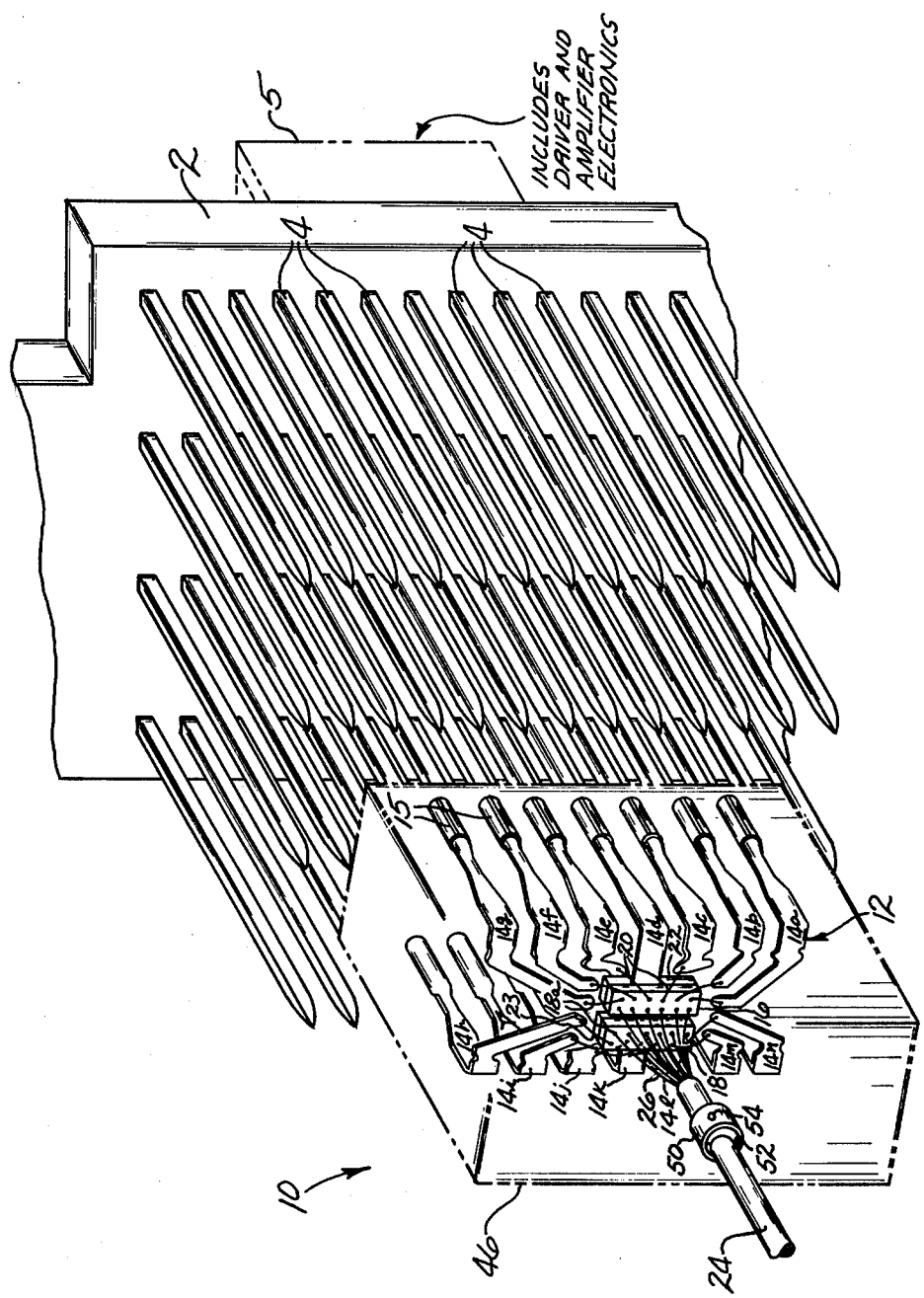
FIG. 1 is a perspective view of a connector made in accordance with a first embodiment of the invention which includes dual chips. The connector is shown with the housing in phantom but without any fiber optic guide plate in order to facilitate illustration.

While separate chips are included in the FIG. 1 embodiment for transmission and reception it will be appreciated that a single chip could be employed having both photo emission and photo reception elements or separate chips for one or more photo active areas or alternatively it may be preferred to include just the transmitter function in a connector placed at one end of the fiber optic cable while putting a receiver function in another connector placed at the other end of the fiber optic cable.

Figure 4:
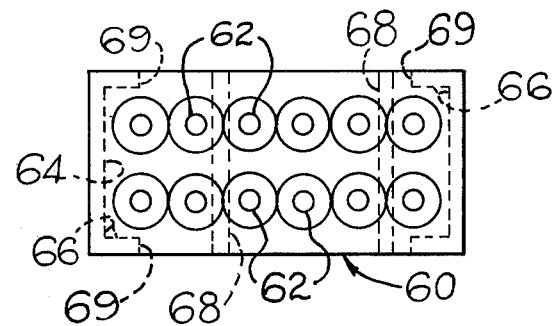
FIG. 4 is a top plan view of a guide plate particularly useful in a connector assembly having a single semiconductor chip with bond emitter and receiver elements.
Figure 6:
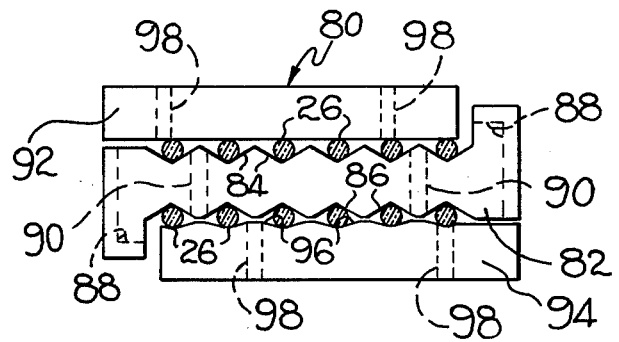
FIG. 6 is a top plan view of another guide plate useful in the FIG. 1 embodiment.

FIGS. 4 and 6 show guide plates which can be used with a double row of fibers. Plate 60 in FIG. 4 has two rows of tapered bores 62 extending from the top to the bottom surface for reception of respective fibers. A recess 64 is formed in the bottom of plate 60 with side walls at diametrically opposed corners 66 serving as indexing means to properly orient the plate and concomitantly bores 62 relative to the chip received in recess 64. Stop surfaces 68 are provided to position the plate on the chip so that the axes of the bores are perpendicular to the top surface of the chip and to provide room for lead wires 20. The side walls are broken away at 69 to allow passage of wires 20 from the lead frame to the bonding pads of the chip.

Figure 5:
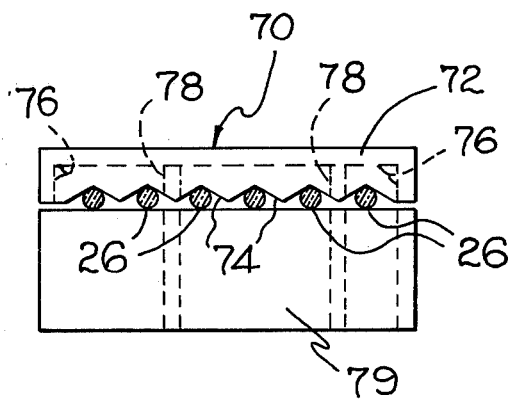
FIG. 5 is a top plan view of a guide plate useful in the FIG. 1 embodiment.

While plate 30, having a single row of bores, and plate 60 having a double row are very effective in locating the fibers in the desired location the guide plates shown in FIGS. 5 and 6 facilitate rapid assembly of the connector. Plate 70 shown in FIG. 5 includes a first body portion 72 in which a row of grooves 74 is formed. Indexing corners 76, in this case on the same side of body portion 72 and stop surfaces 78 are provided as in the guide members of FIGS. 3 and 4 for the same purposes. A second body portion 79 is positioned against fibers 26 precisely locating them in their respective grooves. Either body 72, 79 or both may be composed of elastomeric material to ensure that the fibers are maintained in their proper locations even if there is a misalignment problem which could occur for instance if one fiber were slightly larger than another. Stop surfaces, similar to ribs 78 may be provided or if desired could be eliminated if body 79 is composed of elastomeric material. In assembly, the fibers are merely laid against the row of grooves and smoothed out into the respective grooves. Body portion 72 in indexed onto a suitable chip, body portion 79 is biased against the fibers in the grooves to locate them in the desired location and the assembly is fixed in a conventional jig while a quick setting epoxy is injected into the space between the body pieces and the fibers.

The FIG. 6 embodiment comprises a guide plate assembly 80 comprising a first body portion 82 having a double row of grooves 84, 86, diametrically opposed index corners 88 and stop surfaces 90, again for the same purposes as in the previous embodiments. Second body portion 92 is adapted to be biased against fibers disposed in grooves 84 while third body portion 94 is adapted to be biased against fibers disposed in grooves 86. Ribs 98 may be provided on the bottom surface of the body portions 92 and 94 to provide room for leads 20 extending from the terminal members to the chip or they could be eliminated if desired if elastomeric material is employed for the body portions.

The procedure for assembly of the FIG. 6 embodiment is the same as that of FIG. 5. It will be noted that body piece 94 is provided with a separate row of grooves 96 each aligned with a respective groove in row 86 to more closely enclose the respective fibers. It will be understood that body piece 94 may be provided with a straight edge or alternatively piece 79 of FIG. 5 and 92 and 94 of FIG. 6 may be provided with similar grooves if desired.

A typical use for a connector 10 is illustrated in FIG. 1 which shows a conventional backplane or interconnection device 2 having a plurality of pins 4 extending therefrom. Circuit boards 5 mount thereon various electronic equipment. These boards are mounted on the reverse side of backplane 2 and are connected in any convenient manner, as by edgeborad connectors containing pins 4. Connector 10 is pushed onto selected pins 4 which are received in cylindrical portions 15 of the lead frame 12. The usual electronic components required for matching the electrical characteristics of transmitting and receiving circuitry to those of the photo emitting and detecting elements of the chip including driver and amplifier electronics are located on one such circuit board 5 on the reverse side of backplane 2 where they can be readily tested, serviced and replaced if need be. Thus the connector comprises the portions of the system that require precision mechanical handling contained in a compact efficient package which can be used with any suitable driver and amplifier electronics.

It will be understood that connectors made in accordance with the invention have many other uses. For example, they could be used with extension cords for connecting peripheral equipment to a computer.

It will be understood that it is within the purview of the invention to employ a laser source which provides a more efficient way of getting light into an optical fiber since the light produced by a laser source is more directional; however, LED's as described in the above embodiments are much less expensive and in most cases can be used as a light source to provide an optical link between two pieces of conventional electronic equipment.

If desired, in certain cases, an amplifier could be included in the connector housing with the receiver portion since the problems in the receiver are largely electrical rather than mechanical. Since the optically active areas of the receiver can easily be made larger than a linking fiber essentially all of the light coming out of the fiber will be utilized. Thus where there is a very low level electrical singal coming out of the receiver, due to light loss between the transmitter and the receiver occasioned by normal attenuation with distance, connecting or splicing required in the line, or otherwise an amplifier chip built into the connector would tend to mitigate noise pickup problems.

In certain cases it may be desirable to make the connectors particularly adaptable for retrofit applications in which case the driver would also be included in the connector housing.

In view of the above, it will be seen that the several objects of the invention are achieved and other advantageous results attained.

As various changes could be made to the above constructions without departing from the scope of the invention, it is intended that all matter contained in the above description or shown in the accompanying drawings shall be interpreted as illustrative and not in a limiting sense.

I claim:

1. Interface apparatus for use with a backplane having first and second sides adapted to mount electronic modules on said first side, electrical connecting means disposed on said second side providing interconnection with said electronic modules comprising a housing having an aperture formed in a wall of the housing, a fiber optic cable extending from without said housing through said aperture and terminating in said housing, connector contact means mounted in said housing, said connector contact means comprising a plurality of elements having first and second ends, each said fiber end adapted to be electrically connected to the electrical connecting means disposed on said second side of the backplane, means having optically active areas mounted in said housing and having leads extending from said optically active area means to said second ends of said elements, means disposing said optical fibers in optical communication with said optically active areas and electronics associated with said optically active areas means mounted on said first side of said backplane.

2. Interface apparatus according to claim 1 in which the first ends of the connector contact means are formed into female sockets, a plurality of apertures are provided in a wall of the housing such that an aperture is in alignment with each female socket and the electrical connecting means disposed on the second side of the backplane are in the form of pins receivable in the female sockets.

3. Interface apparatus according to claim 1 in which said optically active areas of said optically active area means includes photo emitting elements and photo detecting elements and said electronic includes driver and amplifier electronics associated with matching electrical characteristics of transmitting and receiving circuitry to those of the photo emitting elements and photo detecting elements.

4. Interface apparatus according to claim 1 in which said optically active areas of said optically active area means includes photo emitting elements.

5. Interface apparatus according to claim 1 in which said optically active areas of said optically active area means includes photo detecting elements.

6. Interface apparatus for use with a backplane having first and second sides adapted to mount electronic modules on said first side, electrical connecting means disposed on said second side providing interconnection with said electronic modules comprising a housing having first and second sides, an aperture formed in said first side and a plurality of apertures formed in said second side, a fiber optic cable extending from without said housing through said aperture and terminating in said housing, connector contact means mounted in said housing, said connector contact means comprising a plurality of elements having first and second ends, each said first end aligned with a respective aperture in said second side of said housing to allow electrical interconnection between said electrical connecting means on said second side of said backplane and said connector contact means, semiconductor chip means having optically active areas mounted in said housing and having leads extending from said chip means to said second ends of said elements, means disposing said optical fibers in optical communication with said optically active areas of said chip means and electronics associated with said optically active areas of said chip means mounted on said first side of said backplane.

7. Interface apparatus according to claim 6 in which said optically active areas of said chip means includes photo emitting elements and photo detecting elements and said electronics includes driver and amplifier electronics associated with matching electrical characteristics of transmitting and receiving circuitry to those of the photo emitting elements and photo detecting elements.

8. Interface apparatus according to claim 6 in which said optically active areas of said chip means includes photo emitting elements.

9. Interface apparatus according to claim 6 in which said optically active areas of said chip means includes photo detecting elements.

* * * * *

UNITED STATES PATENT AND TRADEMARK OFFICE
CERTIFICATE OF CORRECTION

PATENT NO. : 4,184,070

DATED : January 15, 1980

INVENTOR(S) : Lyle E. McBride, Jr.

It is certified that error appears in the above-identified patent and that said Letters Patent is hereby corrected as shown below:

Column 3, line 64, "is" should be -- in --

Claim 1, column 6, line 11 "fiber" should be -- first --.

Claim 1, column 6, line 19, "areas" should be -- area --.

Signed and Sealed this

Thirteenth Day of May 1986

[SEAL]

Attest:

DONALD J. QUIGG

Attesting Officer

Commissioner of Patents and Trademarks